United States Patent [19]

Neubauer et al.

[11] Patent Number: 4,514,090
[45] Date of Patent: Apr. 30, 1985

[54] APPARATUS FOR PROCESSING VISCOUS SUBSTANCES OR SUBSTANCES WHICH BECOME VISCOUS THROUGH PROCESSING

[75] Inventors: Wilhelm Neubauer, Murr; Hans Werner, Stuttgart, both of Fed. Rep. of Germany

[73] Assignee: Werner and Pfleiderer, Stuttgart, Fed. Rep. of Germany

[21] Appl. No.: 474,559

[22] Filed: Mar. 11, 1983

[30] Foreign Application Priority Data

Mar. 12, 1982 [DE] Fed. Rep. of Germany ....... 3208973

[51] Int. Cl.³ ............................ B29B 1/06; B01F 7/12
[52] U.S. Cl. ........................................ 366/91; 366/97; 366/300; 366/301
[58] Field of Search ........................ 366/78, 83, 84, 85, 366/97, 99, 300, 315, 52, 69, 136, 262–264, 302–307, 86, 96, 98, 297, 301, 291, 91; 425/224, 374, 466

[56] References Cited

U.S. PATENT DOCUMENTS

| | | |
|---|---|---|
| 3,042,264 | 7/1962 | Trumbull et al. |
| 3,702,691 | 11/1972 | Fritsch ................................. 366/86 |
| 3,797,808 | 3/1974 | Ma et al. ............................... 366/78 |
| 4,073,013 | 2/1978 | Blach ................................... 366/301 |
| 4,142,805 | 3/1979 | Tadmor . |
| 4,194,841 | 3/1980 | Tadmor ................................ 366/97 |
| 4,213,709 | 7/1980 | Valasmis .............................. 366/99 |
| 4,255,059 | 3/1981 | Mold et al. ........................... 366/97 |

FOREIGN PATENT DOCUMENTS 2933655  8/1979  Fed. Rep. of Germany .

Primary Examiner—Philip R. Coe
Attorney, Agent, or Firm—Laff, Whitsel, Conte & Saret

[57] ABSTRACT

An apparatus for processing viscous substances or substances which can be made viscous during processing has a casing, in whose bore is arranged a rotatable disk rotor, which comprises a shaft provided with disks. The disks only have a limited clearance relative to the bore wall and define between them a chamber, which has an outlet in front of a damming-back point. In order to provide a self-cleaning construction of the disk rotors and particularly the damming-back points, at least two disk rotors are arranged in axially parallel, partly interpenetrating bores. The disks of one disk rotor project into the chambers of the other disk rotor and the outer circumference thereof is substantially clearance-free with respect to the shaft.

12 Claims, 8 Drawing Figures

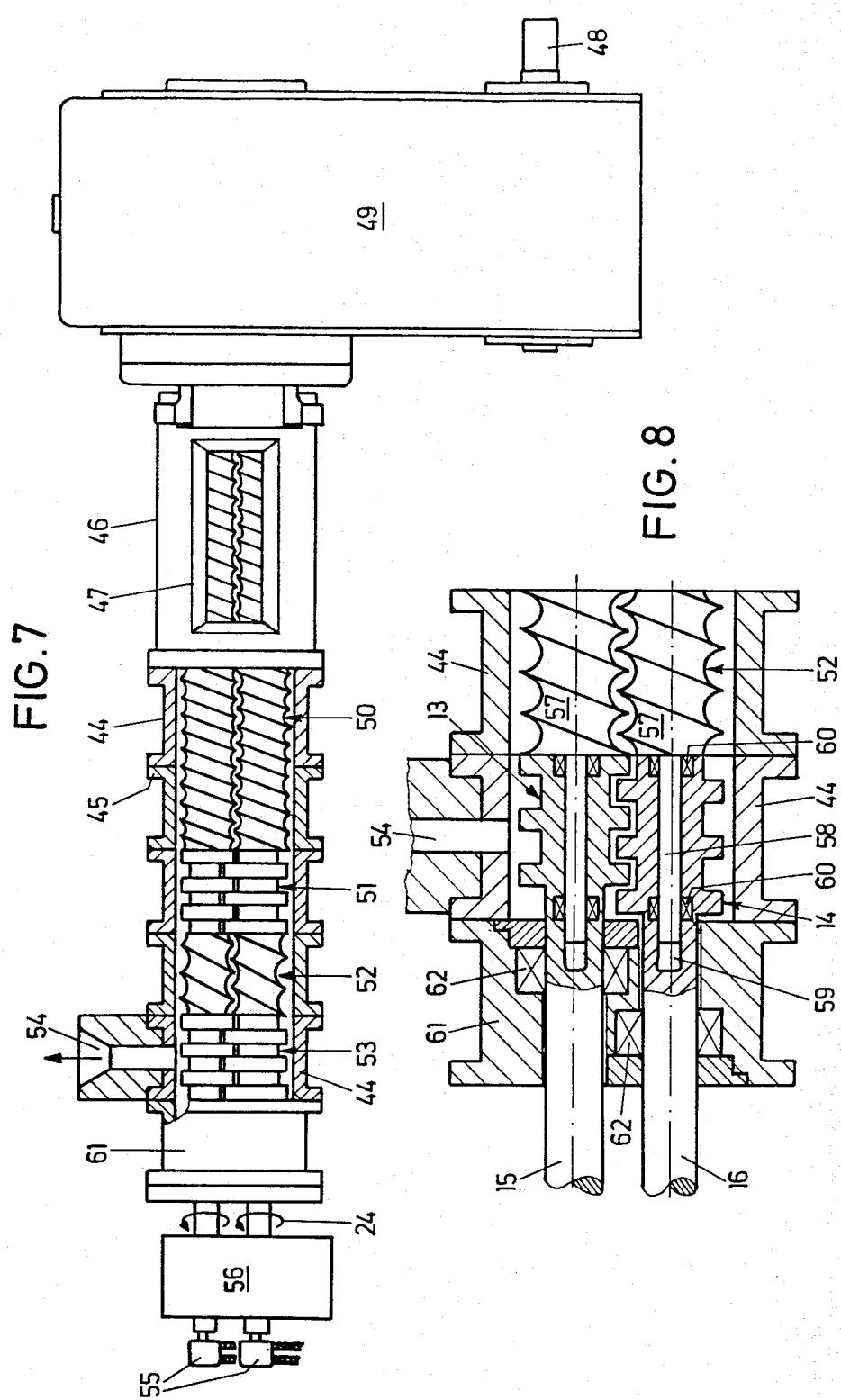

APPARATUS FOR PROCESSING VISCOUS SUBSTANCES OR SUBSTANCES WHICH BECOME VISCOUS THROUGH PROCESSING

BACKGROUND OF THE INVENTION

The invention relates to an apparatus for processing viscous substances or substances which can be made viscous through processing.

In the present context, processing is understood to mean plasticizing, mixing, degassing, reacting, etc. Such an apparatus is known from DE-A No. 29 33 655 (corresponding to U.S. Ser. No. 935,257). In this case, adjacent chambers in a casing have interconnecting overflow passages which, based on the rotation direction of disks, are located in front of a fixed damming-back member projecting into the vicinity of the shaft in one chamber, so that through the damming back of the material in front of the damming-back member, said material is forced via an overflow passage into an adjacent chamber. A basic advantage of this apparatus known as a "Diskpack" is that through the damming back of the material in front of the damming-back member, there is a relative movement between the substance to be processed and the faces of the disks, so that the walls bounding the chamber act on the material therein and bring about the liquefication, plasticizing, feeding, pumping, mixing or degassing thereof. An important advantage of this known apparatus compared with other single-shaft processing means is that it is possible to achieve a much higher pressure build-up and a much better delivery efficiency. It is possible to obtain in a very simple manner large degassing surfaces. However, it is disadvantageous in this known apparatus that the fixed damming-back member is not subject to a self-cleaning action and that relatively large diameters are required with high throughputs per unit of time, which lends to considerable mechanical and process problems in the case of a throughput exceeding 10 t/h. A further very important disadvantage is that the transfer of viscous materials between the chambers must take place outside the actual process zone, which has a disadvantageous effect on the processing quality.

An apparatus which is in principle identical to that described hereinbefore is known from U.S. Pat. No. 4,142,805.

U.S. Pat. No. 3,042,264 discloses an apparatus for processing substances having a casing, in which are arranged two parallel bores which penetrate one another. Each of these bores contains a shaft with disks arranged in rotary manner thereon, a disk of the adjacent shaft projecting into the chamber bounded between the two disks arranged on a shaft. Relatively large openings are provided in the disks and through which on one side is axially conveyed the material, whilst they serve to comminute and mix the same, the boundary lines of said openings serving as shearing or cutting edges.

SUMMARY OF THE INVENTION

The object of the invention is to further develop an apparatus of the aforementioned type, whilst retaining its advantageous characteristics, in such a way that the damming-back members, as well as the disk rotors are constructed in a self-cleaning manner.

According to the invention, there is provided an apparatus for processing viscous substances, or substances which can be made viscous during processing, said apparatus comprising a casing having at least two bores, a respective rotatable disk rotor comprising a shaft provided with closed disks arranged in each of said bores, the disks only having a limited clearance with respect to the walls of the bores whilst defining between them chambers, each chamber having an outlet in front of a damming-back point, wherein said disk rotors are arranged in axially parallel, partly interpenetrating bores, the disks of each disk rotor projecting into the chambers of the or each other disk rotor and the outer circumference thereof being clearance-free with respect to its shaft.

The apparatus according to the invention ensures that the individual chambers are only bounded by moving surfaces, so that a high self-cleaning action is obtained. This simultaneously avoids the formation of dead spaces in which material can collect and which either leads to thermal overloads and resulting material damage, or to mixing and homogenizing problems. Material processing is thus made more uniform and therefore more gentle.

The disk rotors may be arranged to be driven in the same direction. This arrangement is particularly preferred when the apparatus is operating as a compounder.

According to a preferred embodiment of the invention, outlets are constructed as overflow passages in the casing or a bush thereof, said overflow passages being formed in at least one gusset in the penetration area of the bores and extending tangentially to the particular disk and in the direction of the longitudinal axes of the disk rotors, whereby in the direction of the longitudinal axes they interconnect oppositely displaced chambers. This arrangement makes it possible for the material to flow from chamber to chamber without any significant deflections, i.e. tangentially to the disks. This makes it possible to treat more difficult substances, such as e.g. substances into which fillers are to be incorporated. This also permits a very short overall axial length in the case of a comparatively high pressure build-up.

In an apparatus to which there are two disks, overflow passages may be provided in one gusset which interconnect the chambers of one disk rotor with the downstream chambers of the other disk rotor and further overflow passages may be provided in the other gusset which interconnect the chambers of the said other disk rotor with the downstream chambers of the said one disk rotor. With this arrangement, despite the very short overall axial length, very long flow paths for the substance to be processed are obtained. This construction is particularly advantageous for integration as an assembly in a two-shaft extruder. A particularly compact construction with a long flow path is obtained if the overflow passages interconnect in each case adjacent chambers. Alternatively, the overflow passages may be led past at least one adjacent chamber. In this case, a more gentle treatment with a shorter residence time of the substance in the apparatus is obtained.

In an alternative embodiment there are two disk rotors which are arranged to be driven in opposite directions. This arrangement is suitable for operation as a compounder. An inlet and an outlet may be provided in the vicinity of the penetration of the two bores, said inlet and outlet extending substantially over all the chambers of the disk rotors. This arrangement is particularly suitable as a so-called melting pump. If a plurality of such apparatuses are connected with their inlets and outlets arranged in series, they can be used as a compounder. There is no connection between axially adjacent chambers.

If narrow gaps are formed between adjacent disks of said disk rotors, additional shearing effects can be obtained. At least one of the disk rotors may be arranged to be displaceably mounted in the direction of its longitudinal axis.

The process can be controlled by arranging for the disk rotors to be driven at different circumferential speeds. As in general both disk rotors must have the same shaft and disk diameters, different speeds of the rotors are provided by this arrangement.

BRIEF DESCRIPTION OF THE DRAWINGS

The invention is described in greater detail hereinafter with reference to the drawings, in which:

FIG. 7 shows the arrangement of several apparatuses according to the invention in a two-shaft extruder; and FIG. 8 is a partial cutout from FIG. 7 on a larger scale.

DETAILED DESCRIPTION OF THE PREFERRED EMBODIMENTS

Figure 1:
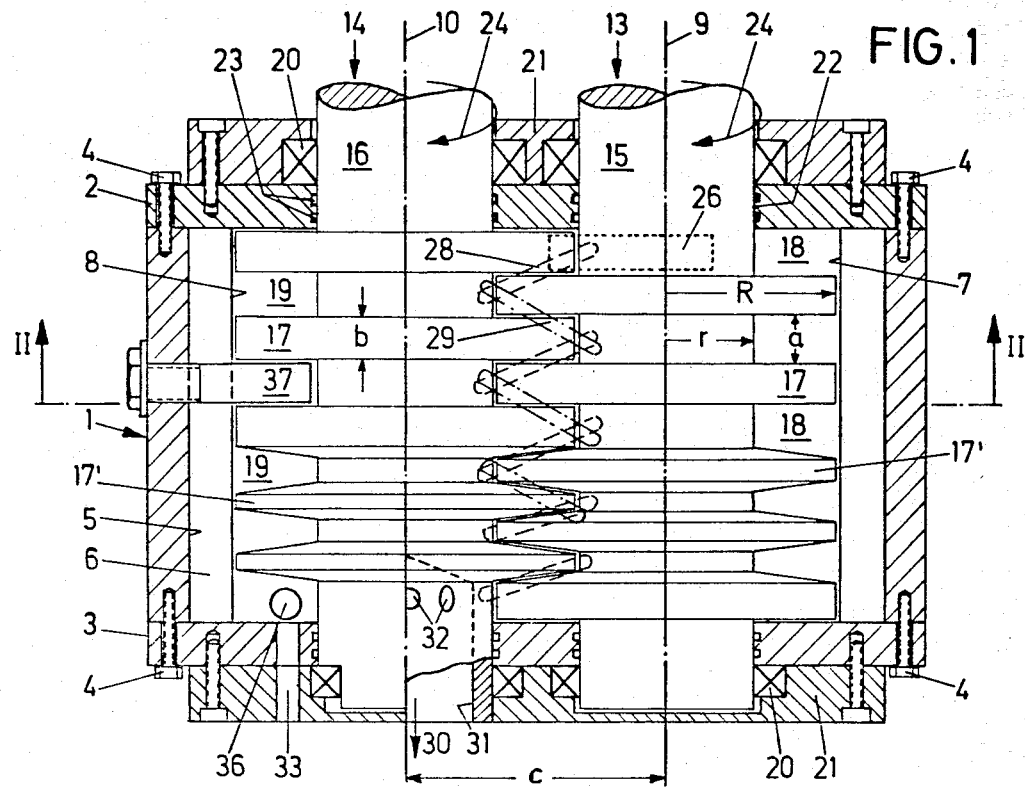
FIG. 1 is a horizontal central section through one embodiment of an apparatus according to the invention.
Figure 2:
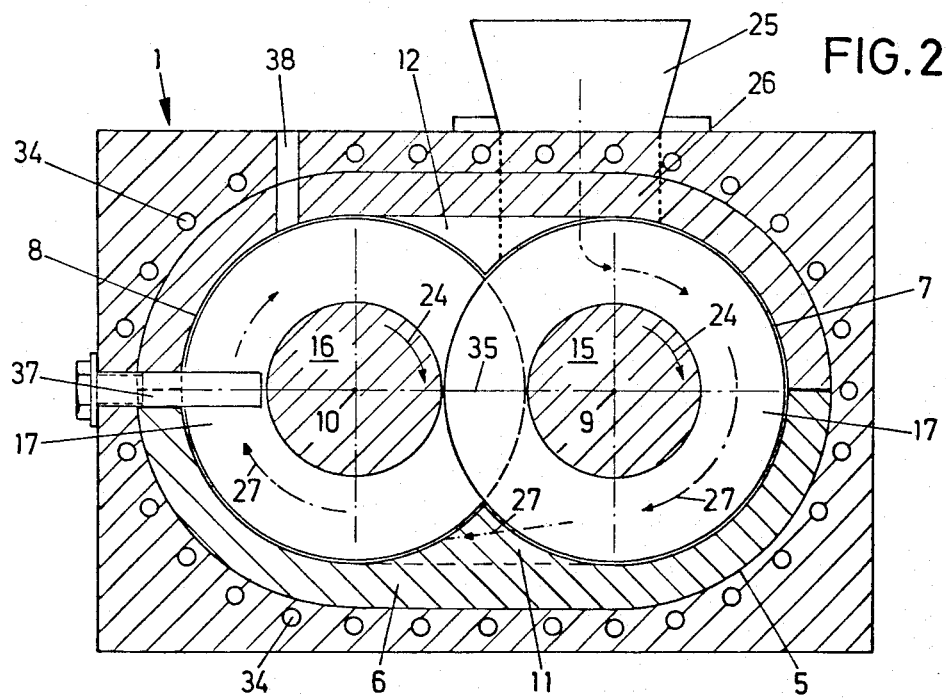
FIG. 2 is a vertical section taken along line II—II in FIG. 1.

The apparatus shown in FIGS. 1 and 2 has a thick casing 1, whose faces are closed by casing side walls 2, 3, which are fitted by means of screws 4. Casing 1 has a longitudinally extending recess 5, i.e. it extends from side wall 2 to side wall 3. Into recess 5 can be inserted a bush 6, optionally in the form of a wear-resistant bush, as is generally the case with two-shaft extruders. Bush 6 has two bores 7, 8, whose longitudinal axes 9, 10 are parallel to one another. As can in particular be gathered from FIG. 2, the two bores 7, 8 penetrate one another, so that bush 6 or, when there is no bush, recess 5 forms two gussets 11, 12 in the penetration zone.

Bores 7, 8 contain two disk rotors 13, 14 whose median longitudinal axes are identical with the axes 9 and 10. Each disk rotor 13 or 14 has a shaft 15 or 16, on which are arranged in each case disks 17. Disks 17 are always closed and, as shown at the top of FIG. 1, constructed as cylinder disks. However, as shown a the bottom of FIG. 1, they can also be constructed as disks 17', which have a cylindrical body and to whose faces are fitted flat truncated cones. The two shafts 15, 16 on the one hand and the disks 17, 17' on the other have in all cases the same diameter, so that disks 17, 17' only have a constructionally necessary clearance with respect to the wall of the particular bore 7 or 8 and this clearance need be only a few tenths of a millimeter. the distance a between two adjacent disks 17 or 17' of a disk rotor 13 or 14 is only a few tenths of a millimeter larger than the axial extension b of the corresponding disk 17, 17' at the radially identical point, so that at the point where a disk 17 of one disk rotor 13 engages between two axially adjacent disks 17 of the other disk rotor 14 or vice versa, there is only a constructionally necessary axial clearance between disk 17 or 17'. The spacing c of axes 9, 10 is only a few tenths of a millimeter larger than the sum of the radius r of a shaft 15 or 16 and the radius R of a disk 17 or 17', so that there is only a constructionally necessary cap of a few tenths of a millimeter between a shaft 15, 16 of a disk rotor 13, 14 and disk 17, 17' of the other disk rotor 14, 13.

As a result of this arrangement, between two axially adjacent disks 17, 17' of rotor 13, 14 is formed an approximately C-shaped chamber 18, 19 bonded on the radial outside by the associated area of the wall of the particular bore 7, 8 and on the inside by shaft 15, 16 and the outer circumferential surface of the disk 17, 17' of the other rotor 14, 13 projecting into the particular chamber 18, 19 and axially by the associated faces of the disks of the associated rotor 13, 14. Thus, all intermeshing boundary surfaces move.

Shafts 15, 16 are mounted in bearing brackets 21 by means of bearings 20 and said brackets are screwed from the outside on to the casing side walls 2, 3. Obviously bearings 20 can also be placed direcly in casing side walls 2, 3. The openings 22 in side walls 2, 3 for shafts 15, 16 are provided with suitable packings 23, e.g. labyrinth packings.

Shafts 15, 16 are driven by a common motor via a distributor gear, which is not shown in FIGS. 1 and 2. In the present embodiment, the rotors 13, 14 are driven in the same direction, i.e. in accordance with the rotation direction arrows 24. Over rotor 13 is provided a feed hopper 25 with an inlet 26 in casing 1 and correspondingly in bush 6, which issues into the first chamber 18 of rotor 13. The position of inlet 26 with respect to chamber 18 is chosen in such a way that, based on rotation direction 24, i.e. on the feed direction 27, inlet 26 is positioned at the beginning of the corresponding chamber 18. A lower overflow passage 28 is milled into the lower gusset 11 at the bottom of chamber 18 and issues tangentially out of the same. As is shown in broken line form in FIG. 1, said passage slopes by amount (a+b)/2 in the direction of axes 9 and 10, so that it issues into the axially displaced, next chamber 19 of the other rotor 14, where the material is taken up by the two disks 17 bounding said chamber 19 and in accordance with the rotation direction 24 is conveyed upwards in the feed direction 27 over a circumference of approximately 270°, where it passes into an upper overflow passage 29 in the upper gusset 12 which, as shown by the dot-dash line in FIG. 1, is also axially displaced by amount (a+b)/2 tangentially to the disk 17 of both rotors 13, 14 and leads to the next chamber 18 of rotor 13. This construction mode is continued over the complete length of casing 1, so that the material is conveyed over a very long path and in constantly alternating manner through process chambers 18, 19 of disk rotors 13, 14, said path roughly corresponding to an arrangement of offset ovals.

At the end of this feedpath, an outlet 30 is provided, which can be formed by a coaxial blind hole 31 in a shaft 16, into which once again issues a series of radial bores 32, which connect the last process chamber 19 in the feed direction with bore 31. Alternatively outlet 30 can also be formed by an outlet 33 in casing wall 3.

Disk rotors 13, 14 can be constructed in one piece or can be built up from individual disk elements, which are mounted on shafts 15, 16 and are connected in non-rotary manner therewith. Casing 1 can contain heating ducts 34 which, if necessary, can also be arranged in bush 6. Bush 6 is normally formed in the main plane of symmetry 35 of the apparatus, divided up by the two longitudinal axes 9, 10, as shown in FIG. 2, in order to permit the easier milling of overflow passages 28, 29. However, it is also possible to construct bush 6 from individual disk-like elements, in which is then individually formed an overflow passage 28, 29. To permit a constructionally simple design of casing side walls 2, 3, the first chamber 18 of one rotor 13 in feed direction 27 and the last chamber 19 of the other rotor 14 in said direction is bounded on the axial external side by the associated casing side wall 2, 3 and not by a disk 17, 17'.

In place of outlet 33 in the associated casing side wall 3, it is obviously also possible to form an outlet 36 in casing 1, which issues radially out of the final process chamber 19.

It is also possible to additionally insert from the outside damming-back or shearing elements 37 into one or more process chambers 19 in order to control the process. Such elements 37 are constructed as bolts in the simplest constructional mode and these are inserted from the outside through the casing wall into the corresponding chamber 19 or 18. Moreover, it is possible to provide degassing openings 38, through which the material to be treated is degassed.

Figure 3:
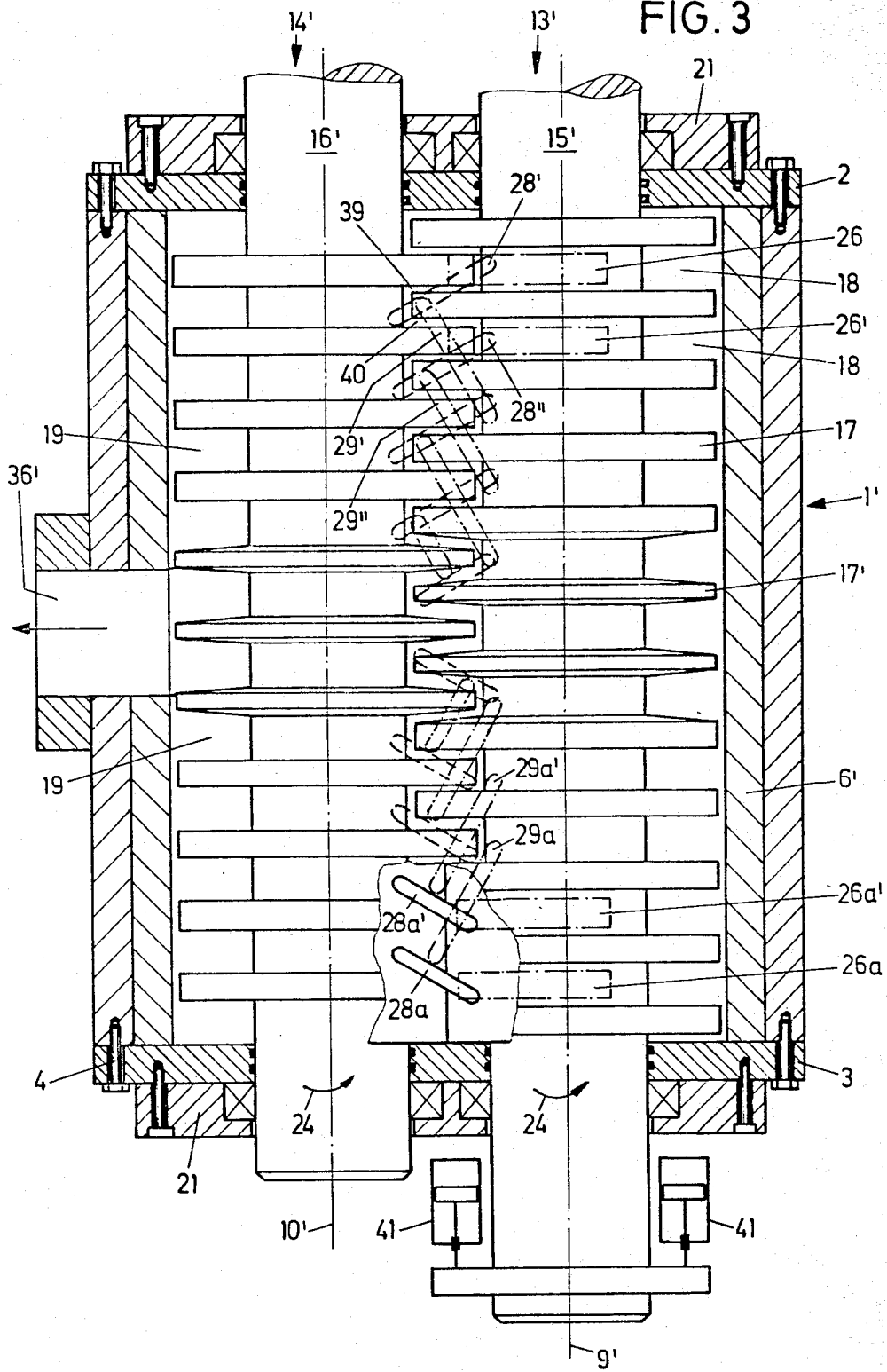
FIG. 3 is a horizontal central section through another embodiment of an apparatus according to the invention.

The embodiment of FIG. 3 is similar to that of FIGS. 1 and 2, so that in FIG. 3 the same parts will be given the same reference numerals and functionally coinciding parts will be given the same reference numerals, followed by one or more apostrophes. A further description will only be given to the necessary extent.

The embodiment of FIG. 3 differs from that of FIG. 1 in that charging takes place from both ends and material transfer does not take place into each immediately adjacent chamber of the adjacent disk rotor. In this case, the disk rotors 13', 14' are provided in their central area with disks 17', i.e. with truncated cone-shaped disks on either side. At one end of casing 1', an inlet 26 is arranged over the first process chamber 18 of rotor 13', said inlet being associated with a further inlet 26' which issues into the immediately adjacent process chamber 18 of the same rotor 13'.

At the other end of the same disk rotor 13' an inlet 26a is arranged above the first chamber 18, whilst a further inlet 26a' is arranged in the immediately adjacent chamber 18 of the same rotor 13'. From process chambers 18 associated with inlets 26, 26' and 26a, 26a' lead, as in the embodiment of FIGS. 1 and 2, lower overflow passages 28', 28" or 28a, 28a' into the process chamber 19 of the other disk rotor 14', which is immediately adjacent in the feed direction. As in the embodiment of FIGS. 1 and 2, overflow passages 28', 28" or 28a, 28a' are arranged in the lower, not shown gusset of bush 6', which is in this case constructed in one part. The corresponding upper overflow passages 29', 29" or 29a, 29a' are also constructed in the upper gusset and run in such a way that they issue into the next but one chamber 18 of the other disk rotor 13', whilst bridging the next chamber 19 of the same rotor 14'. Thus, from each axial end of the apparatus, two substantially separate material flows are conveyed parallel to one another towards the axial centre of the apparatus, said feed process being otherwise the same as in the case of the apparatus according to FIGS. 1 and 2.

As can be gathered from FIG. 3, the two feed flows from each end issue into a chamber 19 of rotor 14', so that two feed flows are in each case combined in one chamber 19 here and they pass out in combined manner through a common radial outlet 36'. Whilst in this embodiment, the lower overflow passages 28', 28", 28a, 28a' are in each case displaced by amount (a+b)/2 in the longitudinal direction of the apparatus, the upper overflow passages 29', 29", 29a, 29a' are displaced by amount 1.5(a+b) in the longitudinal direction of the apparatus. It is only a the end of the flow path, that the final overflow passage 29" and 29a' is only displaced by amount a+b.

In this embodiment, the difference between the axial spacing of two adjacent disks 17, 17' and the axial extension b of a disk 17, 17' is considerably increased and namely up to a few millimeters and in the limit case even up to 10 mm. Thus, between the disks 17, 17' in each case bounding one chamber 18, 19, gaps 39, 40 are formed, through which is forced material and is subject to a shearing action, which can be controlled if the width of gaps 39, 40 is adjustable. Without varying the total width of gaps 39, 40, this can be brought about in that one rotor 13' is constructed in such a way that it can be longitudinally displaced by a small amount. For this purpose, a pair of hydraulically operable working cylinders 41 is coupled to shaft 15' and they are able to displace the corresponding rotor 13' by an amount which is in total smaller than a−b. To prevent a displacment extending beyond this amount and through which the disks of the two rotors 13', 14' could be axially displaced with respect to one another, limit switches are appropriately provided. If as a result of such a displacement a gap 39, 40 is widened, accompanied by a simultaneous and corresponding narrowing of the other gap 40, 39, an easier and consequently gentler material passage is permitted.

Figure 4:
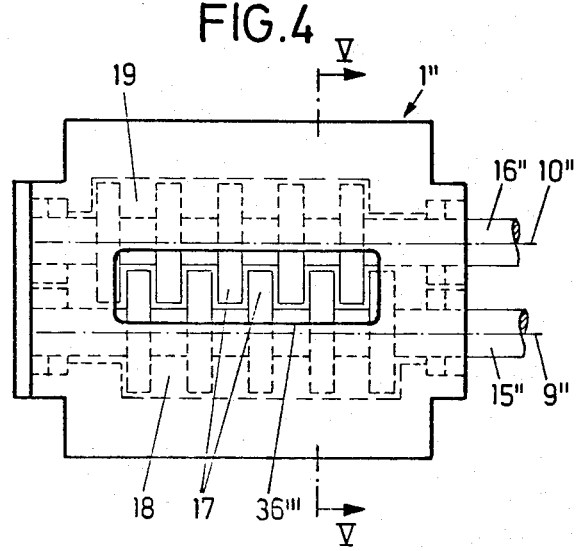
FIG. 4 is a plan view of a third embodiment of an apparatus according to the invention.
Figure 5:
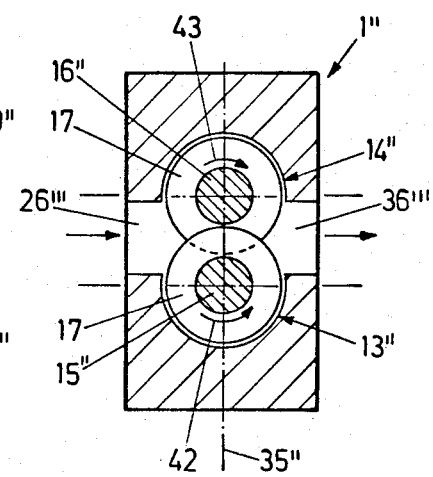
FIG. 5 is a section taken along line V—V in FIG. 4.

FIGS. 4 and 5 show in highly diagrammatic form how an apparatus according to the invention can be constructed as a so-called melting pump. It is advantageous to superimpose shafts 15", 16", i.e. to position the main plane of symmetry 35" in a vertical manner. The shafts are driven in opposite directions, i.e. corresponding to rotation direction arrows 42, 43. An inlet 24'" extends over the length of casing 1", over which extend rotors 13" or 14". Thus, inlet 26'" extends essentially over the area where, in the embodiments according to FIGS. 1 to 3, is extended the upper gusset, which is omitted here. An outlet 36'" extends over the area in which the lower gusset is arranged in the embodiments of FIGS. 1 to 3. The rotation direction according to rotation direction arrows 42, 43 is such that the disks 17 in each case move from inlet 26'" outwards and inwards towards outlet 36'". Thus, in this embodiment, there is no exchange of material from a chamber 18 or 19 into a chamber 18 or 19 or 19 or 18 displaced in the direction of axes 9" or 10". The already liquid material is merely conveyed from inlet 25'" to outlet 36'", accompanied by a corresponding pressure increase.

Figure 6:
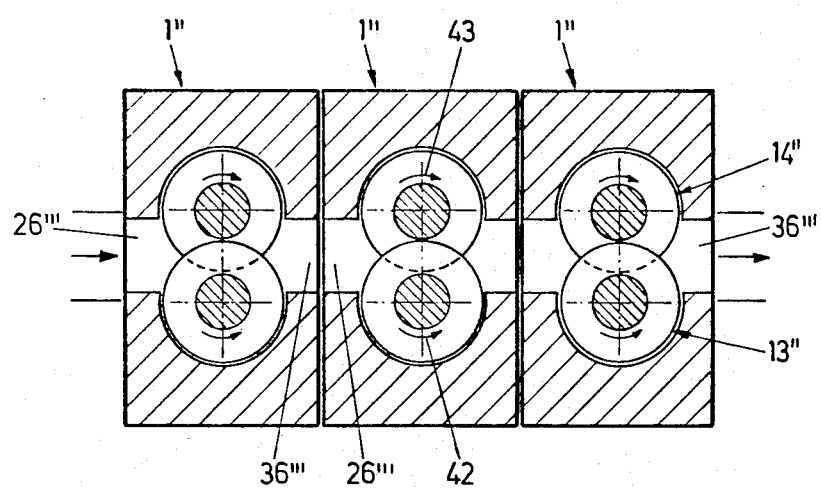
FIG. 6 shows a series connection of the apparatus in the construction according to FIGS. 4 and 5.

As can be gathered from FIG. 6, the construction according to FIGS. 4 and 5 can be used in a series connection as a compounder, i.e. for the purposes fulfilled by the embodiments according to FIGS. 1 to 3. For this purpose a plurality of such apparatuses are connected in series, so that in each case the outlet 36'" of the first apparatus is positioned immediately in front of the inlet 26'" of the next apparatus. The number of apparatuses which can be coupled together in this way is fundamentally unlimited. This permits compounding in the case of an oppositely directed drive of rotors 13", 14", without requiring comparatively complicated and costly measures in the gusset area. Here again a damming-back point or damming-back element is constructed wherever a rotor disk engages or is in the immediate vicinity of the shaft of the other rotor. An outlet is then arranged in front of said damming-back point.

FIGS. 7 and 8 show that the apparatus according to the invention can also be confined with other parts of a two-shaft or multishaft mixing and kneading device. A casing is provided, which comprises a plurality of casing sections 44, which in each case have flanges 45 at their ends, by means of which the individual sections are interconnected in an aligned manner. An inlet casing part 46 is positioned in front of the individual casing sections and is provided with a filling hopper 47. By means of a shaft 48 and a gear 49, a not shown motor drives two parallel, juxtaposed shafts, which are fundamentally shafts 15, 16. As is shown by the broken away view behind the feed area 50 is arranged a plasticizing area 51 containing the intermeshing disk rotors 13, 14 according to the invention. This is followed by a mixing and homogenizing area 52, which is followed by a pressure build-up area 53 equipped with the disk rotors 13, 14 according to the invention and from which radially issues an outlet 54. The construction of the individual areas, with the exception of the disk rotors according to the invention is generally known (cf. e.g. DAS No. 16 79 884, corresponding to U.S. Pat. No. 3,608,868). As can be gathered from the drawing, the supply and removal of the material to be processed takes place in plasticizing area 51 and in the pressure build-up area 53 the material is supplied in the axial direction, i.e. from the side, where in the embodiments of FIGS. 1 to 3 are provided casing side walls 2, 3.

As can be gathered from FIG. 7, by means of a corresponding connection 55 to a corresponding, commercially available pipe coupling, shafts, 15, 16 can be heated in the vicinity of the pressure build-up area 53, but also in the vicinity of the plasticizing area 51 or the homogenizing area 52.

Furthermore, and as is particularly apparent from FIG. 8, the disk rotors 13, 14 in pressure build-up area 53 can be provided with their own drive 56. For this purpose shafts 15, 16 of rotors 13, 14 are led out at the end opposite to gear 49 and are connected to drive 56. The other extruder sections 57 are mounted by means of corresponding shaft journals 58 in bearing bores 59 of rotors 13, 14 by means of bearings 60. Shafts 15, 16 are mounted in a bearing section 61 by means of bearings 62, flanging taking place to the last associated casing section 44. Thus, through a correspondingly higher speed drive of rotors 13, 14 in pressure build-up area 53, a correspondingly higher pressure rise is possible.

What is claimed is:

1. An apparatus for processing viscous substances, or substances which can be made viscous during processing, said apparatus comprising a casing having at least two bores with at least one gusset area between them, two disk rotor means each comprising an elongated rotatable shaft provided with closed disks mounted in corresponding ones of said bores, the disks having a limited clearance with respect to the walls of the bores and defining between them at least one chamber having a damming-back point, said chamber having an outlet in front of said damming-back point, said outlet forming an overflow passage in at least one of said gusset areas and extending tangentially to a particular disk in the direction of a longitudinal axes of the elongated disk rotors, said disks interconnecting oppositely displaced chambers in the direction of the longitudinal axes, said disk rotors being arranged in an axially parallel relationship, partly interpenetrating the bores, the disks of each disk rotor projecting into the chamber or into each other disk rotor, and the outer circumference of the disks being clearance-free with respect to the shaft of the other rotor.

2. An apparatus as claimed in claim 1, in which the disk rotors are arranged to be driven in the same direction.

3. An apparatus as claimed in claim 1, in which there are two disk rotors and in which overflow passages are provided in one gusset which interconnect the chambers of one disk rotor with the downstream chambers of the other disk rotor and further overflow passages are provided in the other gusset which interconnect the chambers of the said other disk rotor with the downstream chambers of the said one disk rotor.

4. An apparatus as claimed in claim 3, in which said overflow passages interconnect in each case adjacent chambers.

5. An apparatus as claimed in claim 3, in which said overflow passages are led past at least one adjacent chamber.

6. An apparatus as claimed in claim 1, in which said two disk rotors are arranged to be driven in opposite directions.

7. An apparatus as claimed in claim 6, in which an inlet and an outlet are provided in the vicinity of the penetration of the two bores, said inlet and outlet extending substantially over all the chambers of the disk rotors.

8. An apparatus as claimed in claim 7, in which a plurality of apparatuses with their inlets and outlets are arranged in series.

9. An apparatus as claimed in claim 1, in which narrow gaps are formed between adjacent disks of said disk rotors.

10. An apparatus as claimed in claim 9, in which at least one disk rotor is displaceable in the direction of its longitudinal axis.

11. An apparatus as claimed in claim 1, in which the disk rotors are arranged to be driven at different circumferential speeds.

12. The apparatus of claim 1 and bush means interposed between said casing and said two disk rotors, said bush means including said gusset area and said two bores.

* * * * *

UNITED STATES PATENT AND TRADEMARK OFFICE
CERTIFICATE OF CORRECTION

PATENT NO. : 4,514,090
DATED : April 30, 1985
INVENTOR(S) : Wilhelm Neubauer and Hans Werner It is certified that error appears in the above—identified patent and that said Letters Patent is hereby corrected as shown below:

Column 1, line 38, Change "lends" to --leads--.

Column 6, line 6, Change "a" to --at--.

Column 6, line 39, Change "24" to --26--.

Signed and Sealed this

Fifteenth Day of October 1985

[SEAL]

Attest:

Attesting Officer

DONALD J. QUIGG

Commissioner of Patents and
Trademarks—Designate